(12) United States Patent
Brandford (10) Patent No.: US 11,790,438 B2
(45) Date of Patent: Oct. 17, 2023

(54) SYSTEM AND METHOD FOR IDENTIFYING FIT OF APPAREL ON A USER

(71) Applicant: FITNONCE, INC., New York, NY (US)

(72) Inventor: Sherwin Brandford, Brooklyn, NY (US)

( * ) Notice: Subject to any disclaimer, the term of this patent is extended or adjusted under 35 U.S.C. 154(b) by 0 days.

(21) Appl. No.: 17/109,936

(22) Filed: Dec. 2, 2020

(65) Prior Publication Data
US 2021/0256599 A1  Aug. 19, 2021

Related U.S. Application Data

(60) Provisional application No. 62/944,115, filed on Dec. 5, 2019.

(51) Int. Cl.
*G06T 7/80* (2017.01)
*G06T 7/60* (2017.01)
*G06Q 30/0601* (2023.01)
*G06Q 10/087* (2023.01)

(52) U.S. Cl.
CPC .......... *G06Q 30/0643* (2013.01); *G06T 7/60* (2013.01); *G06T 7/80* (2017.01); *G06Q 10/087* (2013.01); *G06Q 30/0623* (2013.01); *G06Q 30/0631* (2013.01)

(58) Field of Classification Search
None
See application file for complete search history.

(56) References Cited

U.S. PATENT DOCUMENTS

| 11,004,133 | B1* | 5/2021 | Kim | G06Q 30/0629 |
|---|---|---|---|---|
| 2016/0088284 | A1* | 3/2016 | Sareen | G06T 3/60 |
|  |  |  |  | 348/47 |
| 2021/0235802 | A1* | 8/2021 | Koh | G06N 5/003 |

* cited by examiner

*Primary Examiner* — Samuel D Fereja
(74) *Attorney, Agent, or Firm* — Scarinci Hollenbeck, LLC; Libby Babu Varghese (57) ABSTRACT

A reference object is used in measurement capturing features of the invention to calibrate a camera taking pictures of a user. The position of the reference object in the pictures of the user helps correct for rotations of the reference object that is held by the user. Once user measurements are captured, a total weighted variance is defined to identify correct size of apparel to the user. In addition to the variance, overall fit quality is determined by adding user body shape and fit anomalies of the apparel to the variance.

4 Claims, 12 Drawing Sheets

| SPEC # | SPEC | SPEC DEFINITIONS | CUSTOMER SPEC DESCRIPTIONS | MEN | WOMEN |
|---|---|---|---|---|---|
| 1 | NECK CIRCUMFERENCE | circumference measured at base of neck– lowest part of neck before shoulders begin | Measure the circumference at the lowest part of your neck before the shoulders begin. | X | |
| 2 | CHEST CIRCUMFERENCE | circumference around the torso, measured approximately 2" below armpit, over the bust/chest | Measure the circumference of your torso, approximately 2" below your armpit and over your chest. | X | X |
| 3 | BUST CIRCUMFERENCE | women only – circumference around chest at fullest part of breasts | Measure the circumference of your chest, over the fullest part of your bust. | | X |
| 4 | UNDER BUST CIRCUMFERENCE | Women only – circumference around chest at ribcage under breasts | Measure the circumference of your chest, at the ribcage directly under your breasts. | | X |
| 5 | WAIST POSITION FROM NECK | vertical distance between base of neck (pos 1) and narrowest part of waist (pos 6) | measure the distance from the base of your neck to your natural waist (the narrowest part of your torso). | X | X |
| 6 | WAIST CIRCUMFERENCE | circumference around narrowest part of torso, approximately near the belly button, but the belly button should NOT be used as a reference Point, as this position can vary and is also higher on the torso for woman and lower on the torso for men. | Measure the circumference around the narrowest part of your torso, approximately near the belly button. This is your Natural Waist. | | X |
| 7 | FRONT RISE | From natural waist position (pos 6), measure from the center front of body, over belly button, in between the legs to center of crotch. | Measure the distance from the center of your crotch, over the front of your body, to your natural waist (the narrowest part of your torso). | X | X |
| 8 | BACK RISE | From natural waist position (pos 6), measure from the center of the body, between the legs, to center of crotch | Measure the distance from the center of your crotch, over the back of your body, to your natural waist (the narrowest part of your torso). | X | X |
| 9 | HIGH HIP CIRCUMFERENCE | Circumference around the torso, approximately across the hip bones | Measure the circumference of the torso at the hip bones. | X | X |
| 10 | LOW HIP CIRCUMFERENCE | Circumference of the body approximately around crotch (The crotch is measured from the bottom of the torso where the legs begin), determining the widest part of the body around buttocks | Measure the circumference around the widest part of your hips (approximately around the crotch area). | X | X |
| 11 | THIGH CIRCUMFERENCE | circumference around leg 1" below crotch (The crotch is measured from the bottom of the torso where the legs begin). | Measure the circumference of your thigh, 1" below the crotch (the bottom of the torso where the legs begin). | X | X |
| 12 | KNEE CIRCUMFERENCE | circumference around leg at center of knee cap | Measure the circumference of your leg at the center of your knee cap. | X | X |
| 13 | CALF CIRCUMFERENCE | circumference around leg at widest part of the calf | Measure the circumference of your calf at it's widest part. | X | X |
| 14 | ANKLE CIRCUMFERENCE | circumference around leg at ankle bone | Measure the circumference of your ankle around the ankle bones | X | X |
| 15 | TORSO LENGTH FROM NECK TO LOW HIP | Vertical distance from Neck Circumference (Pos 1) to Low Hip (Pos 8). | Measure the distance from the base of the neck to the low hip point (the widest part of your body). | X | X |

*FIG. 2A*

| SPEC# | SPEC | TOPS | | | | | | | | BOTTOMS | | | | DRESSES | | UNDERGARMENTS/SWIMWEAR | | |
|---|---|---|---|---|---|---|---|---|---|---|---|---|---|---|---|---|---|---|
| | | OUTER WEAR | JACKETS-MENS | JACKETS-WOMENS | SHIRTS (FORMAL) | T-SHIRTS POLOS | OTHER TOPS | SWEATSHIRTS & HOODIES | SWEATERS | TROUSERS | JEANS | SKIRTS | SHORTS | DRESSES-CASUAL | DRESSES-FORMAL | BRAS | UNDERWARE | ONE-PIECE |
| 1 | NECK CIRCUMFERENCE | 2% | 8% | 8% | 8% | 1% | 1% | 2% | 2% | | | | | 1% | 1% | | | |
| 2 | CHEST CIRCUMFERENCE | 16% | 18% | 22% | 19% | 21% | 21% | 21% | 21% | | | | | 18% | 17% | 31% | | 30% |
| 3 | BUST CIRCUMFERENCE | | | | | | | | | | | | | | | 30% | | |
| 4 | UNDER BUST CIRCUMFERENCE | | | | | | | | | | | | | 4% | 13% | 15% | | |
| 5 | WAIST POSITION FROM NECK | 1% | 2% | 2% | 3% | 2% | 2% | 2% | 2% | | | | | | 3% | 1% | | 5% |
| 6 | WAIST CIRCUMFERENCE | 9% | 12% | 16% | 15% | 19% | 19% | 19% | 19% | 22% | 23% | 38% | 23% | 17 | 16% | 10% | 32% | 20% |
| 7 | FRONT RISE | | | | | | | | | 14% | 18% | | 18% | | | | | |
| 8 | BACK RISE | | | | | | | | | 12% | 17% | | 13% | | | | | |
| 9 | HIGH HIP CIRCUMFERENCE | 15% | | | 20% | | 20% | 20% | 20% | | | | | 18% | 10% | | | |
| 10 | LOW HIP CIRCUMFERENCE | | 20% | | | | | | | 24% | 21% | 40% | 21% | 20% | 18% | | 34% | 25% |
| 11 | THIGH CIRCUMFERENCE | | | | | | | | | 7% | 4% | | 12% | | | | 18% | 5% |
| 12 | KNEE CIRCUMFERENCE | | | | | | | | | 3% | 3% | | 8% | | | | | |
| 13 | CALF CIRCUMFERENCE | | | | | | | | | 2% | 2% | | | | | | | |
| 14 | ANKLE CIRCUMFERENCE | | | | | | | | | 1% | 1% | | | | | | | |
| 15 | TORSO LENGTH FROM NECK TO LOW HIP | 1% | | | 2% | 2% | 2% | 1% | 1% | | | | | 2% | 3% | | | 15% |

*FIG. 2B*

| SPEC # | SPEC | SPEC DEFINITIONS | CUSTOMER SPEC DESCRIPTIONS | MEN | WOMEN |
|---|---|---|---|---|---|
| 16 | LEG LENGTH FROM WAIST TO ANKLE (OUTSEAM) | Vertical Distance from Waist (Pos 6) to Ankle (Pos 12) | measure the length of the leg along the outside, from the natural waist to the ankle bone. | X | X |
| 17 | INSEAM LENGTH | Vertical distance from crotch (The crotch is measured from the bottom of the torso where the legs begin) to the bottom of the ankle (approx 2" above floor). | Measure from the crotch (the bottom of the torso where the legs begin), along the inside of the leg, to the ankle bone. | X | X |
| 18 | SLEEVE LENGTH FROM BACK NECK | Standing with arm relaxed by your side, from center back of base of neck (pos 1), across shoulder to shoulder bone, down to elbow, down to approx 1" below wrist bone | Standing with arm relaxed by your side, Measure from the center back base of neck, along to the shoulder bone, down the outside of the arm to the elbow, to the wrist. | X | X |
| 19 | SLEEVE LENGTH FROM SHOULDER | Then start at the middle of the back neck (Pos 1) and measure to shoulder bone, down arm to the elbow, and then on to approx 1" below wrist bone. | Standing with arm relaxed by your side, Measure from the shoulder bone, down the outside of the arm to the elbow, to the wrist. | X | X |
| 20 | SHOULDER WIDTH | Start at shoulder bone, down arm to the elbow, and then on to approx 1" below wrist bone. | Measure from left shoulder bone, around back of neck, to right shoulder bone. | X | X |
| 21 | ARMHOLE DIAMETER | Measurement of circular distance around armpit, over shoulder bone. | Measure the circular distance around your armpit, over the shoulder bone. | X | X |
| 22 | BICEP CIRCUMFERENCE | arm circumference approx 2" below armpit | Measure the circumference of the bicep approximately 2" below the armpit. | X | X |
| 23 | WRIST CIRCUMFERENCE | arm circumference at wrist bone | Measure the circumference of your arm around the wrist bones. | X | X |
| 24 | BODY LENGTH FROM NECK TO FLOOR | From Neck (Pos 1) at side of neck, vertical distance to the floor, standing with flat feet. | Measure from the base of the neck, over the front chest, down the front of the leg, to the floor. | X | |
| 25 | BASE OF BACK NECK TO CROTCH POINT | From back of Neck (Pos 1), vertical distance to crotch point (The crotch is measured from the bottom of the torso where the legs begin) | Measure the distance from the base of the neck, over the chest, to the crotch (where your torso meets your legs). | X | X |
| 26 | BODY DEPTH AT CHEST | Horizontal distance through the body, at Chest (Pos 2), to measure the body depth. | Use two flat objects such as books, and hold them to your back & chest, measure the distance between them approximately 2" below your armpits. | X | X |
| 27 | BODY DEPTH AT WAIST | Horizontal distance through the body, at Waist (Pos 6), to measure the body depth. | Use two flat objects such as books, and hold them to your back & chest, measure the distance between them at your natural waist. | X | X |
| 28 | BODY DEPTH AT HIP | Horizontal distance through the body, at Hip (Pos 8), to measure the body depth. | Use two flat objects such as books, and hold them to your back & front, Measure the distance between at the low hip point. | X | X |

FIG. 2C

| SPEC # | SPEC | TOPS | | | | | | | BOTTOMS | | | | | DRESSES | | UNDERGARMENTS/SWIMWEAR | | |
|---|---|---|---|---|---|---|---|---|---|---|---|---|---|---|---|---|---|---|
| | | OUTER WEAR | JACKETS-MENS | JACKETS-WOMENS | SHIRTS (FORMAL) | T-SHIRTS POLOS | OTHER TOPS | SWEATSHIRTS & HOODIES | SWEATERS | TROUSERS | JEANS | SKIRTS | SHORTS | DRESSES-CASUAL | DRESSES-FORMAL | BRAS | UNDERWARE | ONE-PIECE |
| 16 | LEG LENGTH FROM WAIST TO ANKLE (OUTSEAM) | | | | | | | | | 7% | 5% | 10% | 3% | | | | | 7% |
| 17 | INSEAM LENGTH | | | | | | | | | 8% | 6% | 12% | 2% | | | | | 9% |
| 18 | SLEEVE LENGTH FROM BACK NECK | 10% | 10% | 10% | 10% | 10% | 10% | 10% | 10% | | | | | 10% | 7% | | | |
| 19 | SLEEVE LENGTH FROM SHOULDER | | | | | | | | | | | | | | | | | |
| 20 | SHOULDER WIDTH | 12% | 11% | 14% | 12% | 12% | 12% | 12% | 12% | | | | | 5% | 4% | | | |
| 21 | ARMHOLE DIAMETER | | | | | | | | | | | | | | | | | |
| 22 | BICEP CIRCUMFERENCE | 4% | 2% | 6% | 7% | 9% | 9% | 9% | 9% | | | | | 3% | 2% | | | |
| 23 | WRIST CIRCUMFERENCE | 3% | 1% | 2% | 4% | 4% | 4% | 4% | 4% | | | | | 2% | 1% | | | |
| 24 | BODY LENGTH FROM NECK TO FLOOR | | | | | | | | | | | | | | | | | |
| 25 | BASE OF BACK NECK TO CROTCH POINT | 13% | | | | | | | | | | | | | 5% | | | |
| 26 | BODY DEPTH AT CHEST | 14% | 16% | | | | | | | | | | | | | | | |
| 27 | BODY DEPTH AT WAIST | | | | | | | | | | | | | | | | | |
| 28 | BODY DEPTH AT HIP | | | | | | | | | | | | | | | | | |

| SPEC # | SPEC | Weighting | Fit Models Size 30 | 32 | 34 | 36 | 38 | 40 | Fit Model's Specs | Variance bet fit model spec and garment size | Customer A Specs |
|---|---|---|---|---|---|---|---|---|---|---|---|
| 1 | NECK CIRCUMFERENCE | | | | | | | | | | |
| 2 | CHEST CIRCUMFERENCE | | | | | | | | | | |
| 3 | BUST CIRCUMFERENCE | | | | | | | | | | |
| 4 | UNDER BUST CIRCUMFERENCE | | | | | | | | | | |
| 5 | WAIST POSITION FROM NECK | | | | | | | | | | |
| 6 | WAIST CIRCUMFERENCE | 25% | 32 | 34 | 36 | 38 | 40 | 42 | 33.5 | 0.5 | 35 |
| 7 | HIGH HIP CIRCUMFERENCE | | | | | | | | | | |
| 8 | LOW HIP CIRCUMFERENCE | 30% | 40 | 41 | 43 | 45 | 47 | 49 | 40 | 1 | 42 |
| 9 | THIGH CIRCUMFERENCE | 20% | 23.375 | 24 | 25.25 | 26.375 | 27.5 | 28.625 | 23 | 1 | 24 |
| 10 | KNEE CIRCUMFERENCE | 15% | 16.5 | 17 | 18 | 18.34 | 19.5 | 20.25 | 18.5 | 0.5 | 18 |
| 11 | CALF CIRCUMFERENCE | | | | | | | | | | |
| 12 | ANKLE CIRCUMFERENCE | 10% | 15 | 15.5 | 16.25 | 16.75 | 17.25 | 17.75 | 14 | 1.5 | 15.5 |
| 13 | TORSO LENGTH FROM NECK TO LOW HIP | | | | | | | | | | |
| 14 | LEG LENGTH FROM WAIST TO ANKLE (OUTSEAM) | | | | | | | | | | |
| 15 | INSEAM LENGTH | | | | | | | | | | |
| 16 | SLEEVE LENGTH FROM BACK NECK | | | | | | | | | | |
| 17 | SLEEVE LENGTH FROM SHOULDER | | | | | | | | | | |
| 18 | SHOULDER WIDTH | | | | | | | | | | |
| 19 | BICEP CIRCUMFERENCE | | | | | | | | | | |
| 20 | WRIST CIRCUMFERENCE | | | | | | | | | | |
| 21 | BODY LENGTH FROM NECK TO FLOOR | | | | | | | | | | |
| | | 100% | | | | | | | | | |

| Stated Size | 30 | 32 | 34 | 36 | 38 | 40 |
|---|---|---|---|---|---|---|
| Customer A weighted Variances | | | | | | |
| WAIST CIRCUMFERENCE | -0.75 | -0.25 | 0.25 | 0.75 | 1.25 | 1.75 |
| LOW HIP CIRCUMFERENCE | -0.6 | -0.3 | 0.3 | 0.9 | 1.5 | 2.1 |
| THIGH CIRCUMFERENCE | -0.125 | 0 | 0.25 | 0.475 | 0.7 | 0.925 |
| KNEE CIRCUMFERENCE | -0.225 | -0.15 | 0 | 0.051 | 0.225 | 0.3375 |
| ANKLE CIRCUMFERENCE | -0.05 | 0 | 0.075 | 0.125 | 0.0175 | 0.225 |
| Total weighted variance | -1.75 | -0.7 | 0.875 | 2.301 | 3.85 | 5.3375 | weighted 0.85

| Spec# | Spec | Spec# | Spec | Ratio Description | | Customer Ratio | Fit Model Ratio |
|---|---|---|---|---|---|---|---|
| 5 | WAIST CIRCUMFERENCE | 5 | LOW HIP CIRCUMFERENCE | WAIST CIRCUMFERENCE TO HIP CIRCUMFERENCE | | | |
| Fit model Spec | 32.5 | | 37 | | 0.878378378 | | |
| Cust #1 | 33 | | 39 | | 0.84615846 | | |
| Cust #2 | 43 | | 48 | | 0.895833333 | | |
| | | | fit mode to cust 1: | | | 3.67% | |
| | | | fit mode to cust 2: | | | 1.99% | |
| 5 | CHEST CIRCUMFERENCE | 6 | WAIST CIRCUMFERENCE | CHEST CIRCUMFERENCE TO WAIST CIRCUMFERENCE | | | |
| Fit model Spec | 38 | | 32.5 | | 1.169230769 | | |
| Cust #1 | 37 | | 32 | | 1.15625 | | |
| Cust #2 | 38.5 | | 33.5 | | 1.149253731 | | |
| | | | fit mode to cust 1: | | | 1.11% | |
| | | | fit mode to cust 2: | | | 1.71% | |
| 10 | LOW HIP CIRCUMFERENCE | 28 | BODY DEPTH AT HIP | HIP CIRCUMFERENCE TO BODY DEPTH AT HIP | | | |
| Fit model Spec | 37 | | 11.5 | | 3.217391304 | | |
| Cust #1 | 39 | | 12.5 | | 3.12 | | |
| Cust #2 | 38 | | 11 | | 3.454545455 | | |
| | | | fit mode to cust 1: | | | 3.03% | |
| | | | fit mode to cust 2: | | | -7.37% | |

FIG. 4A

| Spec# | Spec | Spec# | Spec | RATIO DESCRIPTION | CUSTOMER RATIO | FIT MODEL RATIO |
|---|---|---|---|---|---|---|
| 2 | CHEST CIRCUMFERENCE | 26 | BODY DEPTH AT CHEST | CHEST CIRCUMFERENCE TO BODY DEPTH AT CHEST | | |
| Fit model Spec | 38 | | 9 | | 4.222222222 | |
| Cust #1 | 37 | | 9.5 | | 3.894736842 | |
| Cust #2 | 38.5 | | 8.5 | | 4.529411765 | |
| | | | fit mode to cust 1: | | 7.76% | |
| | | | fit mode to cust 2: | | -7.28% | |
| 6 | WAIST CIRCUMFERENCE | 27 | BODY DEPTH AT WAIST | WAIST CIRCUMFERENCE TO BODY DEPTH AT WAIST | | |
| Fit model Spec | 32.5 | | 7 | | 4.642857143 | |
| Cust #1 | 32 | | 6.5 | | 4.923076923 | |
| Cust #2 | 33.5 | | 7.5 | | 4.46666667 | |
| | | | fit mode to cust 1: | | -6.04% | |
| | | | fit mode to cust 2: | | 3.79% | |

*FIG. 4B*

| SEGMENT | FIT RATING | TOPS | | | | | | | | BOTTOMS | | | | DRESSES | | UNDERGARMENTS | |
|---|---|---|---|---|---|---|---|---|---|---|---|---|---|---|---|---|---|
| | | OUTER WEAR | MEN JACKETS | WOMEN JACKETS | SHIRTS (FORMAL) | T-SHIRTS/POLOS | OTHER TOPS | SWEATSHIRTS HOODIES | SWEATERS | TROUSER | JEANS | SPORTS | SHORTS | DRESSES -CASUAL | DRESSES -FORMAL | BRAS | UNDERWARE |
| MEN | GREAT | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% |
| | OKAY | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% |
| | POOR | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% |
| WOMEN | GREAT | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% | +/- 5% |
| | OKAY | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% | +/- >5-10% |
| | POOR | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% | +/- >15% |

FIG. 5

FIG. 6

SYSTEM AND METHOD FOR IDENTIFYING FIT OF APPAREL ON A USER

PRIORITY CLAIM

This application is based upon and claims the benefit of priority from U.S. Prov. Appln. Ser. No. 62/944,115, filed on Dec. 5, 2019, the entire contents of which are incorporated herein by reference.

FIELD OF THE INVENTION

The present disclosure is directed to computer systems for providing measurement specifications using images of a consumer and identifying apparel that fits the consumer's measurements specifications.

BACKGROUND OF THE INVENTION

Online purchases of apparel, whether the apparel is clothing for the body or footwear, comes with the unfortunate expectation that the apparel may not fit the intended party. The reason for this is that apparel grading rules used by brands use to create various sizes do not accurately account for the reality of different body shapes and sizes of the public. Furthermore, based on our research generic size chart's provided by online retailers are not particularly helpful to consumers both because they are limited in scope and most consumers don't know their body measurements. Thus, there is a significant percentage of cases where the body shape of a consumer is materially different from the fit of the apparel on a model donning the outfit who is used to define a base size.

Due to such issues in purchasing apparel, consumers often purchase the desired item in different sizes so the consumer may evaluate the proper fit of the apparel, be it clothing or footwear. Alternatively, some consumers avoid purchasing apparel online unless it is from a brand they have a long purchase history with and feel confident about their sizing construct. In cases where ill-fitting items are purchased, they are returned by the consumer to the seller. This process is time consuming, frustrating to the consumer and costly to the retailer. What is desired is a way to determine size of an apparel such as clothing or footwear before making an online purchase. What is also desired is a determination of an appropriate, suitable or proper fit of apparel for a user. What is further desired is identification of a suitable fitting apparel to the user prior to purchasing an apparel item. Other computer-based solutions to this problem currently available on the market have meaningful shortcomings which this solution addresses.

SUMMARY OF THE INVENTION

Body measurements are captured from image of a user by employing a reference object as part of the measurement capturing features of the invention. The reference object is used to calibrate a camera taking pictures of a user. The position of the reference object in the pictures of the user helps correct for rotations of the reference object that is held by the user. Once user measurements are captured, a total weighted variance is defined to identify correct size of apparel to the user. In addition to the variance, overall fit quality is determined by adding user body shape and fit anomalies of the apparel to the variance

DESCRIPTION OF THE DRAWINGS

FIGS. 2A-2D show apparel categorization along with an example of the weightings that could be applied.

DETAILED DESCRIPTION OF THE INVENTION

Figure 1A:
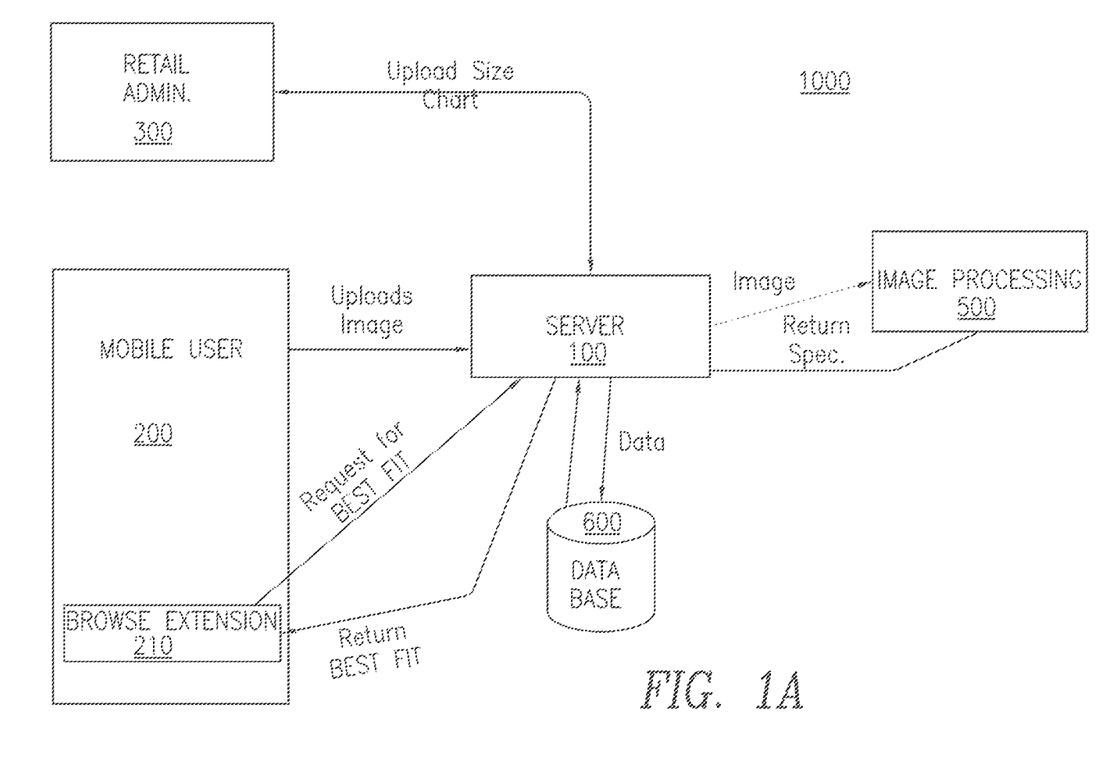
FIG. 1A shows a system schematic.
Figure 1B:
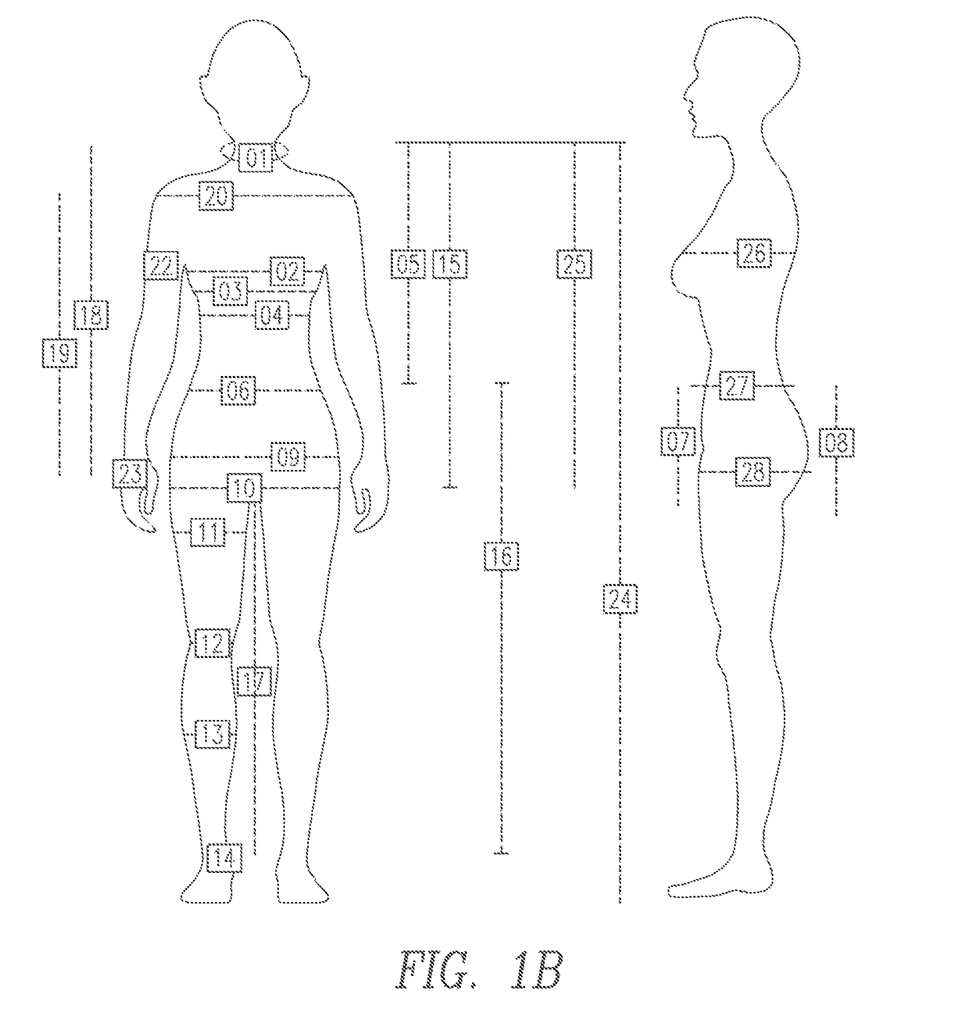
FIG. 1B shows possible measurement points to be taken on a body.
Figure 1C:
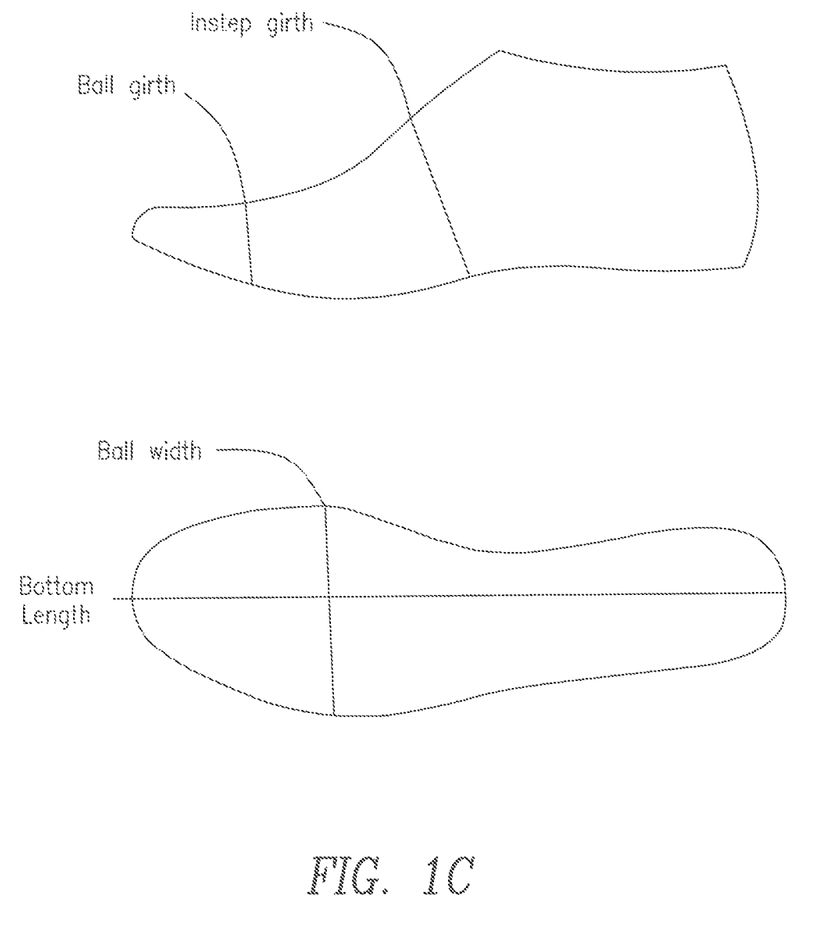
FIG. 1C shows possible measurements points to be taken on a foot.

Elements of the present invention may be implement using system 1000 shown in FIG. 1. FIG. 1 is a block diagram illustrating a computing system 1000 for determining a suitable fit for a user. System 1000 may include retail or administrative module 300, user module 200 with a browser extension/application 210, a server 100, database 600 and image processer 500. All data transmission are conducted via a network. The network may be of any suitable type, including individual connections via the Internet, such as cellular or Wi-Fi networks. Because the information transmitted may be personal or confidential, security concerns may dictate one or more of these types of connection be encrypted or otherwise secured. In some embodiments, however, the information being transmitted may be less personal, and therefore, the network connections may be selected for convenience over security. The network may include any type of computer networking arrangement used to exchange data. For example, network may be the Internet, a private data network, virtual private network using a public network and/or other suitable connection(s) that enables components in system 1000 to send and receive information between the components of system 100.

Retail or administrative module 300 may be operated by brand or other apparel vendor. Apparel may be either or both clothing and footwear. Retail/administrative module 300 may include Brand/Manufacturer Data such as Graded Specification Sheets applicable to all apparel and/or footwear items being offered for sale by various retailers. The Graded Specification Sheets may also include a brand's own retail platform with identifying information showing which products each Graded Specification Sheets applies to and identifying the Base Size for the product.

Retail/administrative module 300 may further include a list of products available for sale at various retailers along with identifying information such as UPC codes, style numbers and SKU numbers as well as product attributes such as color, product category (e.g. T-Shirt).

User module 200 may be operated by a user using a mobile device, a tablet, a desktop computer, or any computing system. User module 200 may have pre-determined consumer measurement specifications, purchase history and other profile information. Additionally, at the user module 200 is browser extension or application 210 The browser extension or application 210 may be representative of a web browser that allows access to a website or a stand-alone application. By accessing the browser extension or application 210 in the user module 200, the user communicate over network to request a webpage, for example, from server 100. As a result, content from the server 100 may displayed on the user module 200 through a graphical user interface (GUI) at any device at the client module 200 end.

Server 400 connects to each the retail module 330, the user module 200, database 600 and image processor 500. Database 600 may include a pre-determined set of measurement specifications for a Fit Model who was used to create a Base Size namely Fit Model measurement specifications as well as a database of apparel and footwear items offered for sale online and through brick and mortar stores, if applicable. Alternatively, or additionally, such information may be stored at the retail/administrative module 300. Apparel/footwear database should include some or all of the following: the product ID number used to identify the product online, the UPC code for each product, brand's/manufacturer's style and SKU numbers and the product description as well as other product attributes such as product category and subcategory.

Figure 2B:
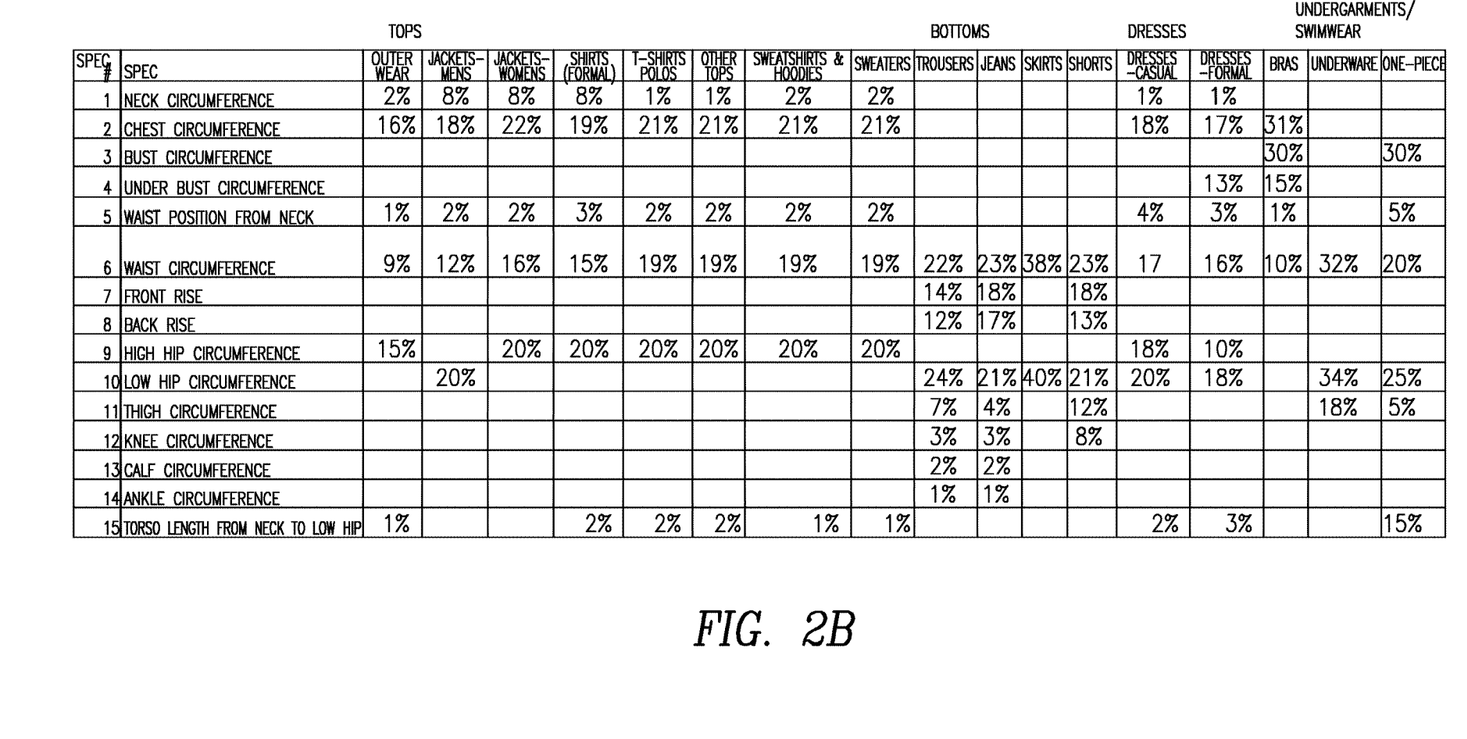
Figure 2D:
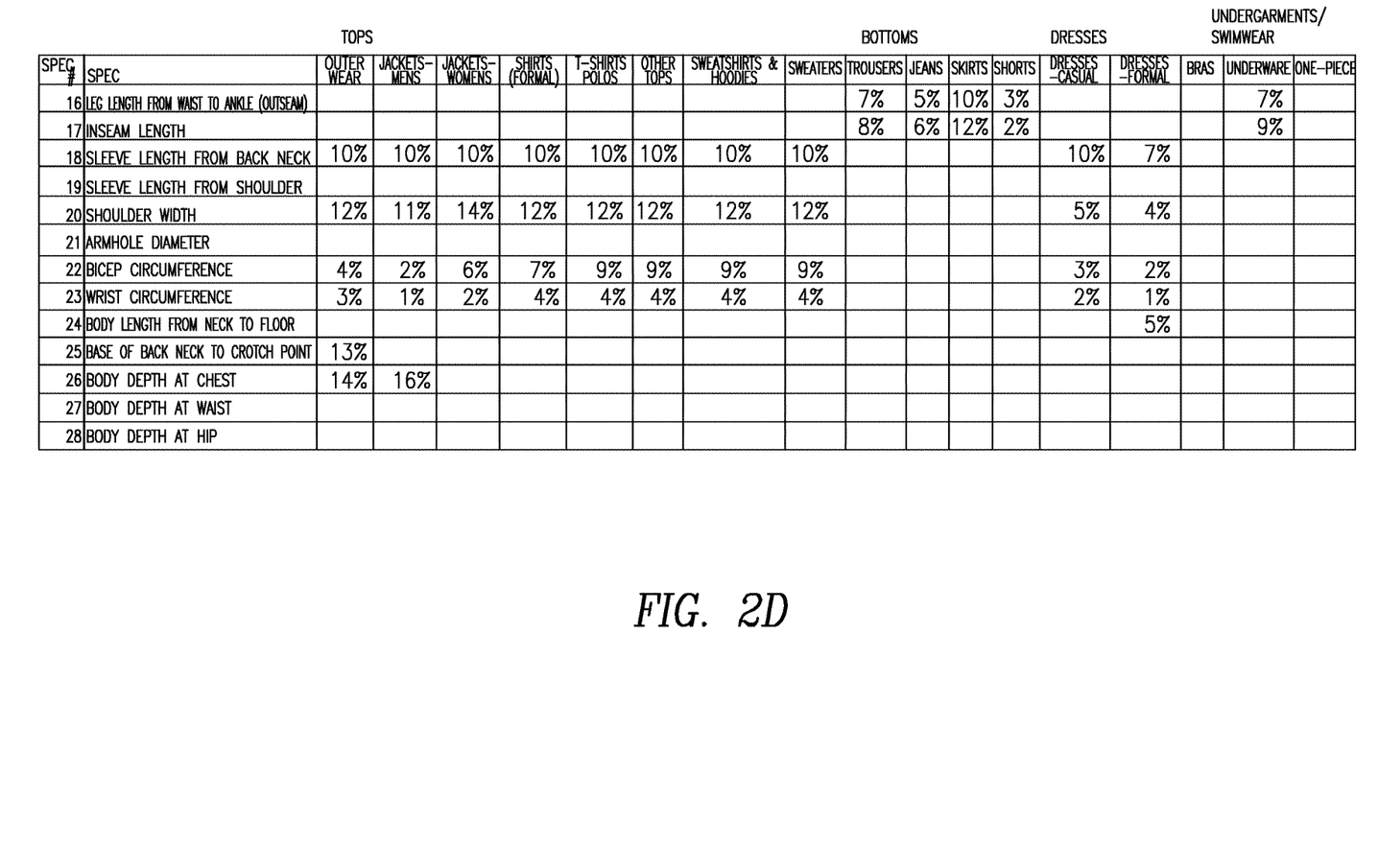
Figure 3:
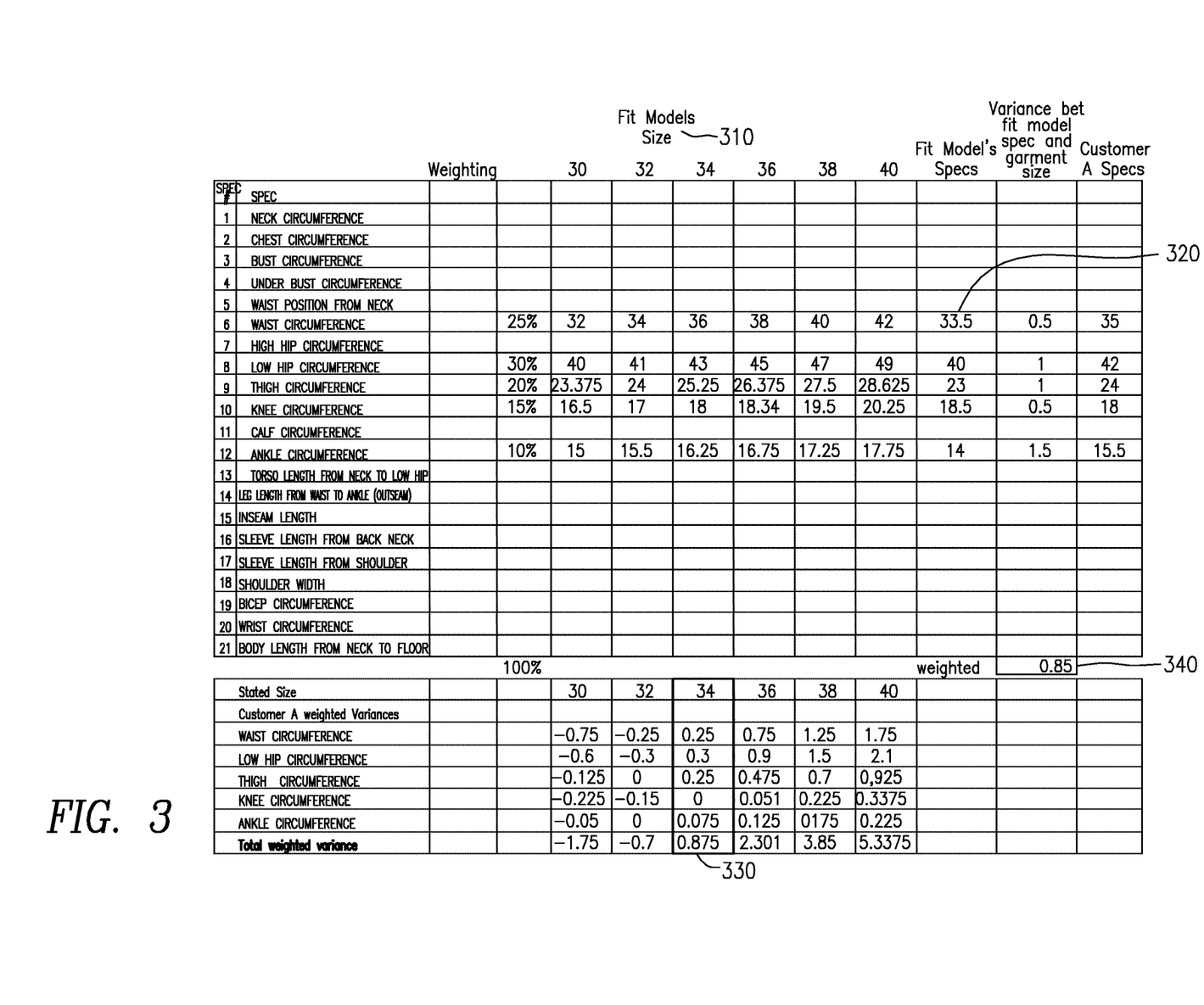
FIG. 3 shows an example of when a user is shopping online for jeans.

Image processor 500 processes images to obtain specifications of a user. Specifically, user measurements are acquired via a camera on a mobile device. Other image capture devices could also be used. In one embodiment, a front view and a side view photo or image are taken while the user adopts prescribed poses. In another non-limiting example, the user may be asked to slowly rotate their body 360 degrees while several photos or a video is taken with their camera. Pre-defined measurement specifications of the user's body and foot may be obtained as shown in FIG. 2 and FIG. 3. Computer Vision technology may be used to extract user dimensions as part of the image processing module.

Open Computer Vision technology is a complement with a method for extracting the extrinsic matrices from the image to calibrate the camera for devices where such calibration isn't possible or is error prone. The user takes the photo or video while holding a reference object, an object of known dimensions. Such calibration method is one way to replicate the calibration process that may be automatically done by devices having stereo or depth cameras or other calibration techniques that may not be as reliable. Further, using this method of calibration for processing the image of an animate object (i.e. a person) poses a unique challenge that must be compensated for. This challenge derives from the fact that when the user holds the refence object while taking the photo or video there will invariably be some level of rotation of the object that must be corrected for. The degree to which the object is rotated is unpredictable and in one embodiment, the rotation of the reference object along the x and y axis is detected and correct for prior to extracting the extrinsic matrices from the image of the user.

Users may be provided a list of reference objects they can chose to hold. Some non-limiting examples of reference items include a credit card/ATM card, a specially created plastic card of fixed dimension, however other sized and shaped objects could be used. The use of a reference item is particularly helpful when the user uses a mobile device or phone not equipped with a stereo camera or depth camera. The invention may use artificial intelligence to identify which of the objects on the list they are holding. Such a calibration method permits one way to obtain measurement accuracy at an acceptable level.

Once user body measurements are captured, then properly fitting apparel size for a user can be identified. For apparel, there are two customer attributes that drive apparel fit on a user. These attributes are body size and body shape. Both body size and body shape need to be taken into account to accurately address the issue of fit.

Determining Correct Size

When a user or customer selects an apparel item on a shopping site, correct size of the selected apparel is determined by taking into account user measurement specifications or user body measurements, the specifications or measurements of the apparel and specifications or measurements of a model donning the apparel also called a Fit Model. The Fit Model is one selected by the fashion designer to have a Base Size for the apparel.

Identifying proper fit is accomplished by organizing a global list of measurement specifications applicable to consumers. This global list provides measurement specifications different categories of apparel and a weighting is applied to each measurement specifications. The weighting represents the relative importance of that a particular measurement specification has in detennining the fit or suitability of that category of apparel to the user or consumer. FIGS. 2A-2D show apparel categorization along with an example of the weightings that could be applied. For instance, looking at row 1 in FIGS. 2A-2B, one can see how the neck circumference in defined and that a 2% weight is applied to the neck for outerwear indicating the relative important of neck circumference in determining the fit of outerwear.

Taking the weightings a step further, a full set of measurements for the user is captured and then the particular categories for a particular apparel item is identified to determine a fit. In FIGS. 2A-2D, cells highlighted the same color under one column are "either/or" and artificial intelligence may be used to choose relevant customer specifications to compare to based on apparel specifications.

Once the body measurements of the user are captured it is compared to apparel specifications of an apparel to define at a total weighted variance. The total weighted variance is a difference between said captured body measurements of the user to said apparel specifications. Also, the Fit Model's measurement specifications are compared to the apparel specifications for the Base Size of the apparel. This results in the ability to determine variances between the measurement specifications of the Fit Model and the corresponding measurement specifications for the Base Size of the apparel. These variances capture the differences caused by different types of fabrics as well as different styles of the same category of apparel. For example, knit fabrics would have a negative variance numbers since it stretches to fit the Fit Model's body.

FIG. 3 shows an example of when a user is shopping online for jeans. Here size 32 is the Fit Model's correct size i.e. the base size of the garment from which other sizes are extrapolated. Size 32 of a pair of jeans has a waist circumference of 34 inches, see 310. The Fit Model's actual waist circumference may be 33.5 inches, see 320, when weighted by the 25% weighting the variance between the fit model's measurements and the measurements of the jean are noted as 0.5. The percentage variance is arrived based on weighting each applicable measurement specifications for that category of apparel. Once the other areas relevant to the jean are calculated similarly, the percentage variance is identified. Each of the weighted variances are summed up to give the total weighted variance between the Fit Model's measurement specifications and the specifications of the apparel, see ref. no. 340.

In order to determine the best size of the apparel for the customer, the total weighted variance is calculated between the customer's measurement specifications and the apparel's specifications for each of the available sizes of the apparel and matches the customer with the size which has a total weighted variance that is closest to the total weighted variance between the Fit Model's measurement specifications and the base size of the apparel, see 330.

In one embodiment, this methodology is further refined to ensure the best size of the shopper among the choices offered by the brand is also their correct size. To do this further refine this to ensure the weighted total variance for the correct size is evaluated to see if it falls within an acceptable range of the weighted total variance of the base size relative to the fit model. For example, if the weighted total variance of the correct size among the list of choices is 20 percentage points smaller or greater than the weighted total variance of the base size relative to the fit model the user is shown a message indicating that there is no size that fits them well. Without this threshold in place every shopper will always be recommended a size among the list of options even if, for example, the largest size accommodates a waist circumference of 40 inches and the shopper's waist is 60 inches.

After the total weighted variance is defined, then apparel fit quality and apparel fit anomaly are added to compliment the total weighted variance thereby identifying apparel size fitting the user.

Determining Overall Fit Quality

The process of identifying the correct size and fit for the customer is further refined with the concept of fit quality which takes into account the customer's body shape relative to the shape of the fit model that the base size was fitted to. As stated above, the grading rules brands use to create various sizes that are larger and smaller than the base size do not accurately account for the significant percentage of cases where the body shape of the customer is materially different from that of the fit model used for the base size. Further, body shape captures a different dimension of the factors that drive fit than body size. The fit quality evaluates the user's captured body measurements to the body measurements of an apparel model who wore the apparel desired by the user.

Figure 4A:
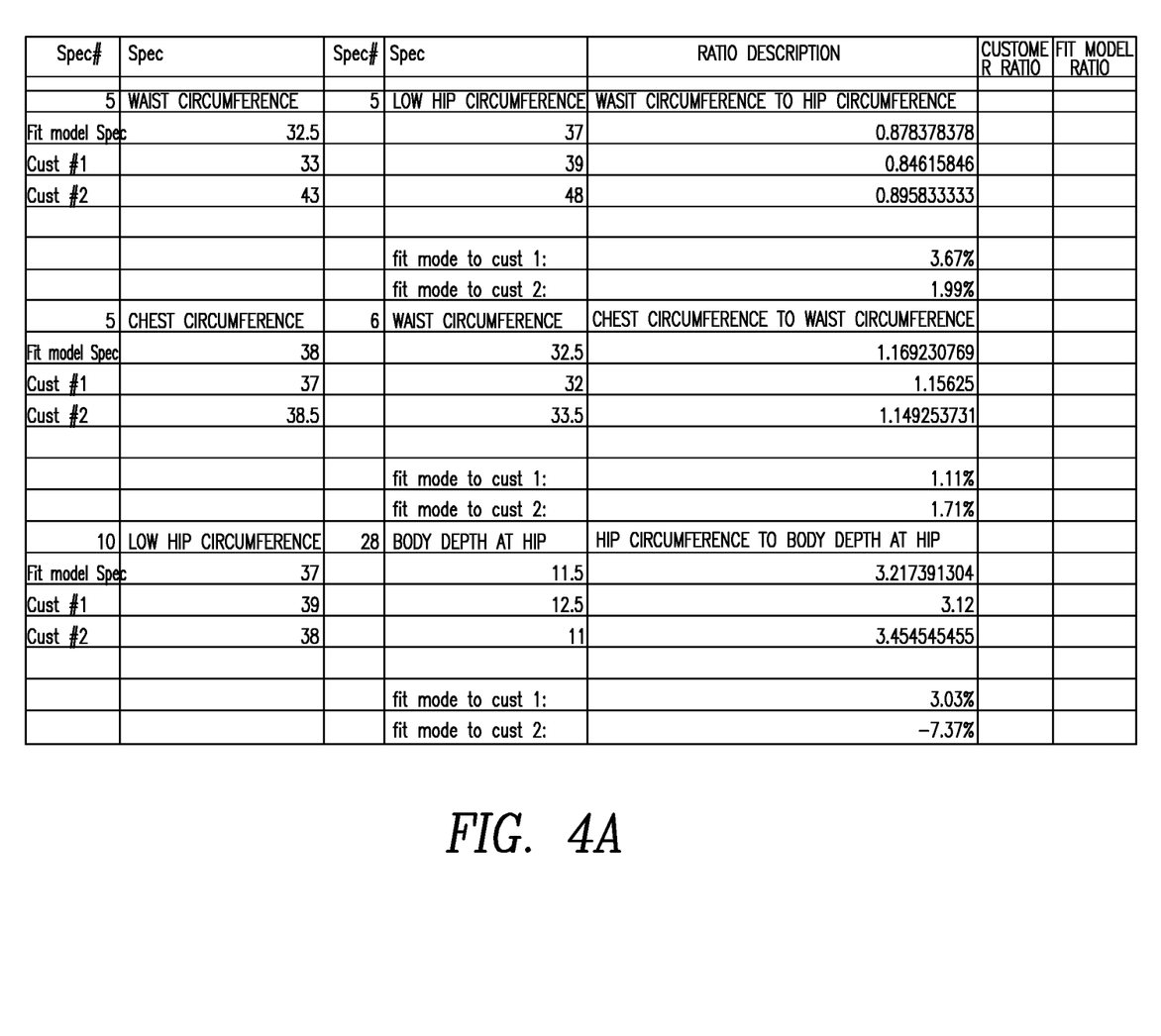
FIGS. 4A-4B show fit quality.
Figure 4B:
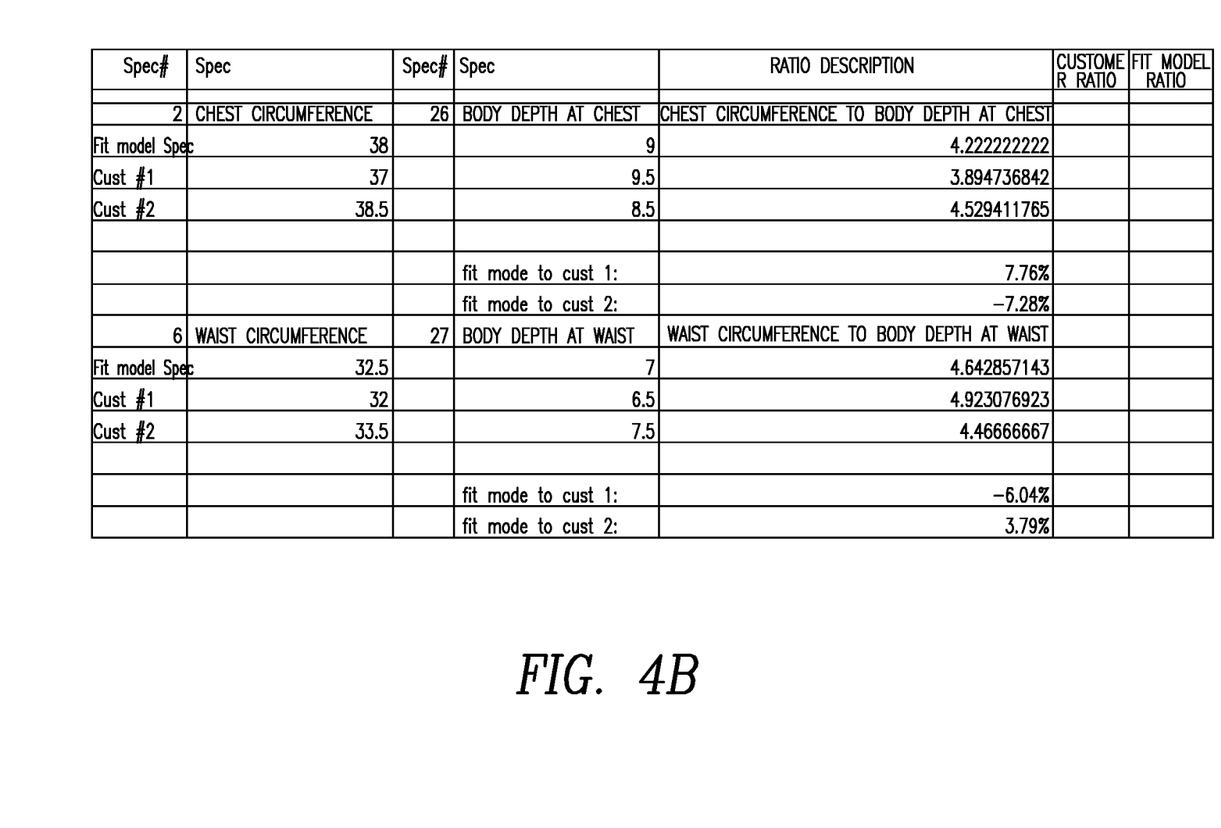
Figure 5:
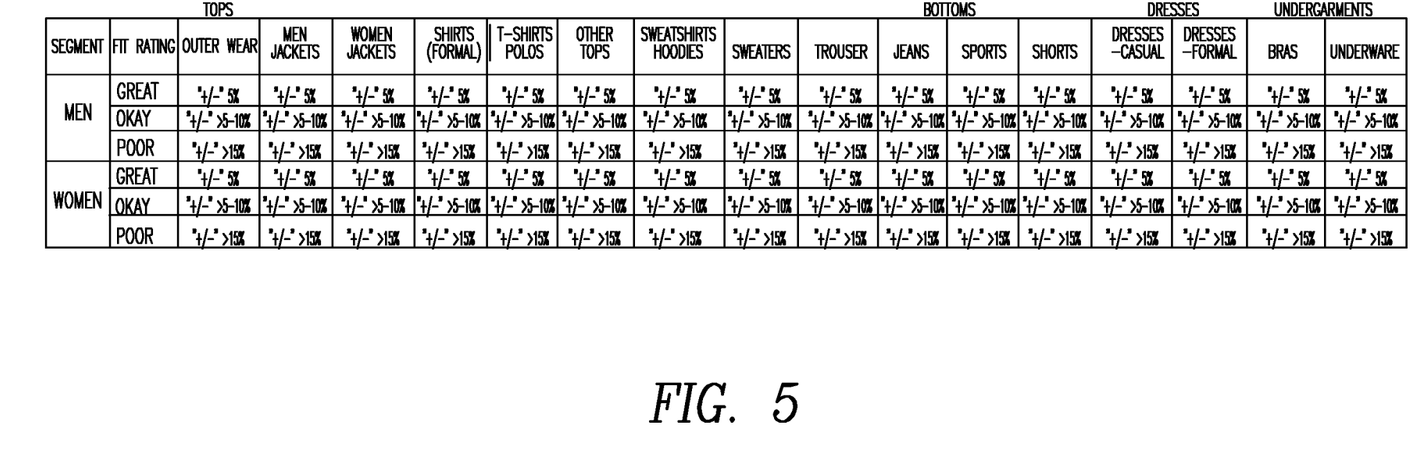
FIG. 5 shows fitting grade.

The fit quality includes a comparison of a first body measurement to a second body measurement for each said user and said apparel model or Fit Model. Such comparisons are shown in FIGS. 4A to 4B. Next the overall fit quality based on how wide the difference is between the ratios for the fit model and the user, see FIG. 5. FIG. 5 defines the grade of fit such as but not limited to "great", "okay", or "poor". Alternatively, Excellent, Good, Modest or some similar set of comparative/superlative adjectives may be used. There may be any number of ratios between a first body measurement and a second body measurement to determine a fit quality. In one instance, five ratios are used to determine fit quality, see FIGS. 4A and 4B. Each of the five ratios is determined at the server 100 for the measurements of each the Fit Model and the customer.

Looking at FIGS. 4A and 4B, a first ratio is shown of a waist circumference to a low hip circumference for a Fit Model and a customer 1 and a customer 2. When the first ratio for the Fit Model is compared to that for customer 1, a value of 3.67% is determined. Taking the 3.67% value and looking now to FIG. 5, the ratio of the waist circumference to the low hip circumference, when used to purchase jeans for men would be a "great" fit, as the 3.67% is within +/−5%. Then taking the ratio for a chest circumference to a body depth at chest, see FIG. 4B, the ratio of the Fit Model to the customer is 7.76% so for the same male customer described above, purchase of a men's jacket would be deemed an "okay" fit. However, in practice, all ratios will be used to determine an overall fit. For instance, when four of the ratios are "great" and one is "poor" then the overall fit for the user is deemed "poor." Fit may be categorized based on the worst ratio within the analyzed ratios. Alternatively the overall fit quality categorization may be based on averaging the results of all of the ration comparisons.

Fit Anomalies

Apart from determining the correct size of the garment for the user/customer, the quality of the fit is assessed and the customer is informed of where the fit of the apparel may be off. For example, if the customer is purchasing jeans and the browser extension recommends their correct size option but the thigh area is a little tight because of the shape of the customer's body then the user will be notified that the thigh area may be a little tight.

Figure 6:
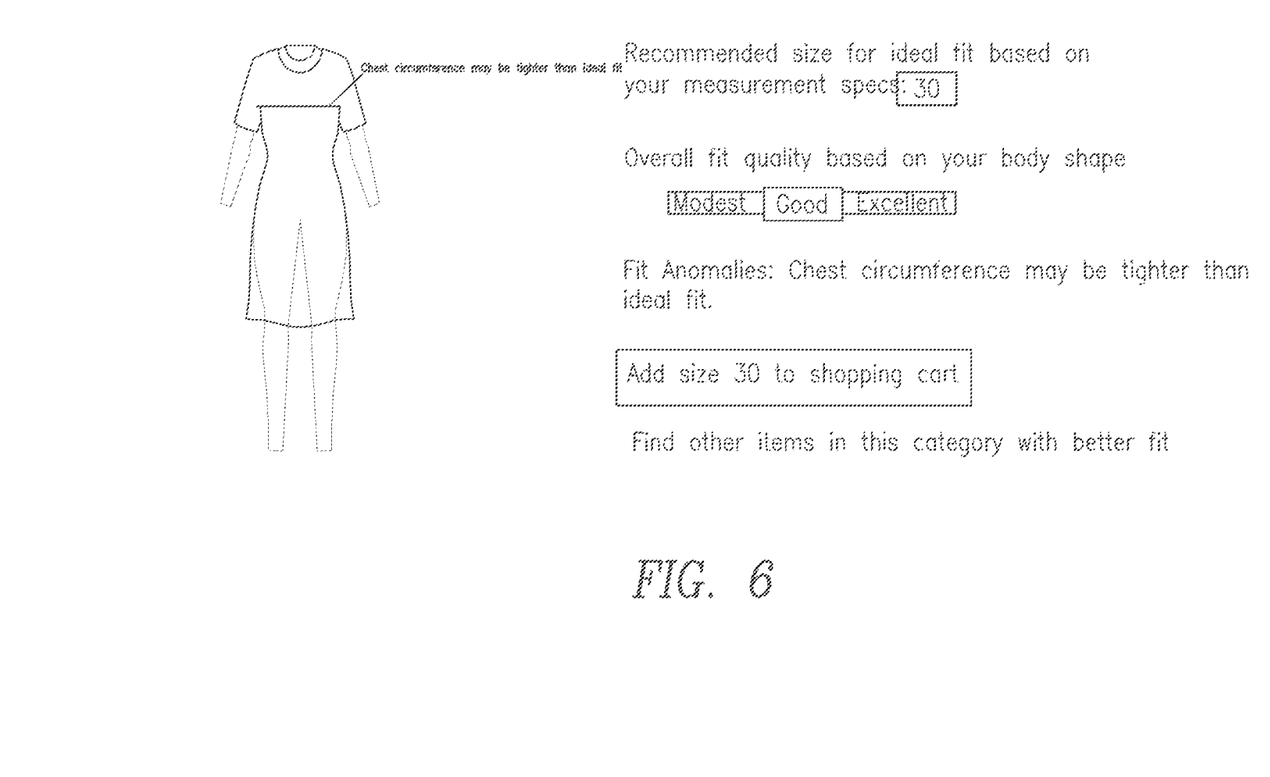
FIG. 6 shows a sample screenshot of the invention in use.

The fit anomaly identifies when the captured user body measurements and the apparel specifications varies from the apparel model body measurements and said apparel specifications. The variation defined in the fit anomaly may be defined as a percentage. In one embodiment, a variation of greater than 20% defines a poor fitting apparel. In that case that metric will be identified as one where the garment's fit will be suboptimal in that area. The fit anomalies will be shown in the same popup described and illustrated in FIG. 6.

In practice, a user or customer may download browser extension or application 210. The browser extension or application 210 retains user information such as profile and, if not already, will store user body measurements relative to measurement specifications for apparel of interest on shopping websites. To create a profile, the user is guided through browser extension or application 210. Profile information may include one or all of name, location, gender, email address, other demographic data, purchase history, etc. In one embodiment, consumer or user measurement specifications are stored on the server 100 via database 600. In another embodiment consumer or user measurement specifications may be stored locally on the user's device 200.

In another embodiment, users or customers may log into a website account to access a size recommendation feature by clicking on a button placed on a retailer's website to log the system of the present invention. Using the present invention, the user is able to have user measurement data evaluated against specifications of an apparel while shopping. Users or customers may shop online as usual and the present invention determines which apparel of interest would best fit the user/customer. For brands and online retailer who employ the present invention, fit recommendation of the present invention will be displayed to the consumer.

In one embodiment, when a customer selects an item of interest, using the present invention the user clicks on a button appearing on the retailer's webpage to learn the user's correct size in that item of interest. Also, information regarding the general fit via a popup similar to the example shown in FIG. 6. In the same popup, the user may be shown an image of themselves wearing the item of interest. The image shown takes into account the user's measurements and the measurement specifications of the item of interest so the user can visualize how the article looks on them before making a purchase. The user may also be able to see how the item (color, style, etc.) looks on them. Additionally, if there is another item in the same category available on the website that fits better, the user may be informed of this so they purchase that item instead.

While specific embodiments of the invention have been described and illustrated, such embodiments should be considered illustrative of the invention only and not as limiting the invention as construed in accordance with the accompanying claims. One of ordinary skill in the art could alter the above embodiments or provide insubstantial changes that may be made without departing from the scope of the invention.

I claim:

1. A method of identifying apparel size for a user comprising:

identifying a base size for an apparel;

identifying apparel specifications for the base size and any available sizes of the apparel;

identifying body measurements of a fit model;

comparing each said body measurements of the fit model to the apparel specifications of the base-size;

identifying body measurements of a user;

comparing each said body measurements of the user to the apparel specifications of the base size and any available sizes of the apparel;

defining variance for each said apparel specification for the apparel, said variance is the difference between the body measurements of the fit model or the user and the apparel specifications;

defining weights for each said apparel specification for the apparel;

defining weighted percentage variance for each said apparel specification for the apparel, wherein said weighted percentage variance is derived by applying said weights to each said variance;

defining a total weighted variance, said total weighted variance is a sum of all weighted percentage variances for a size of the apparel;

identifying the total weighted variance for the fit model for the base size of the apparel;

identifying a best size of the apparel for the user, wherein said identified best size is defined as the size for which said total weighted variance of the user is closest to said total weighted variance of the fit model for the base size;

applying a threshold to a difference between the total weighted variance of the user and the fit model, wherein no apparel size is identified;

identifying fit quality of said apparel; and identifying fit anomaly of said apparel.

2. The method of claim 1, wherein said fit anomaly identifies when said captured user body measurements to said apparel specifications varies from said apparel model body measurements to said apparel specifications.

3. The method of claim 2, wherein said variation in said fit anomaly is greater than a certain percent for example 20%.

4. The method of claim 1, wherein said weighted percentage variance for said user is arrived by applying said weights to each said body measurements of the user and said weighted percentage variance for said fit model is arrived by applying said weights to each said body measurements of the fit model.

* * * * *